Aug. 9, 1927.  
H. P. LEE  
1,638,586  
REEL OR SWIFT  
Filed Dec. 4, 1924  
2 Sheets-Sheet 1

Inventor:
Harry P. Lee,
By Watson, Coit, Morse + Grindle,
Attorneys.

Aug. 9, 1927.
H. P. LEE
1,638,586
REEL OR SWIFT
Filed Dec. 4, 1924
2 Sheets-Sheet 2
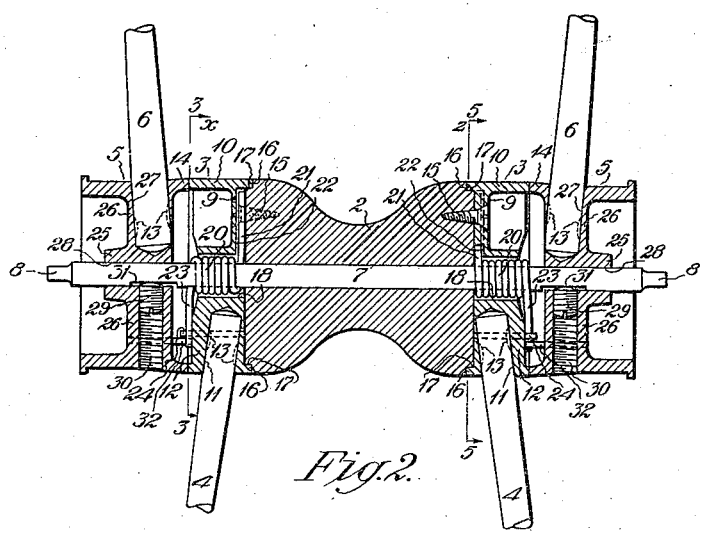
Fig.2.
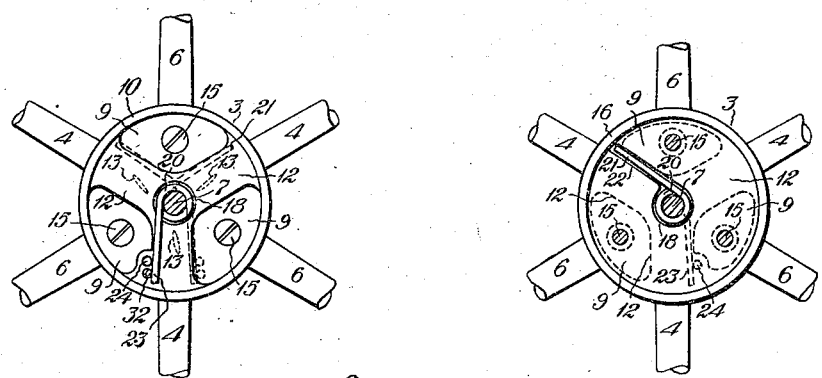
Fig.3.
Fig.5.
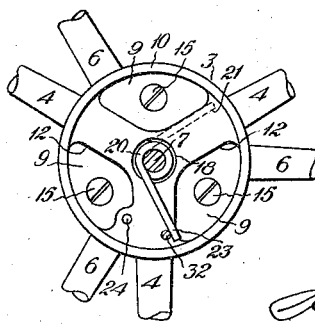
Fig.4.
Inventor:
Harry P. Lee,
By
Watson, Coit, Morse
& Grindle Attorneys.

Patented Aug. 9, 1927.

1,638,586

UNITED STATES PATENT OFFICE.

HARRY P. LEE, OF CRANSTON, RHODE ISLAND, ASSIGNOR TO UNIVERSAL WINDING COMPANY, OF BOSTON, MASSACHUSETTS, A CORPORATION OF MASSACHUSETTS.

REEL OR SWIFT.

Application filed December 4, 1924. Serial No. 753,948.

This invention relates to an improved reel or swift for holding skeins or hanks of thread, yarn and other materials to accomplish the unwinding of the strands therefrom.

The principal object of the improvement is to provide a reel or swift having cooperating radial arms or spokes for supporting the skeins or hank with its strands stretched under tension, and with the arms adapted to be drawn together to facilitate the placing of the skein thereon.

Another object of the improvement is to provide a reel or swift in which the correlated pairs of arms or spokes are shiftable toward each other in either direction to render it convenient to contract the reel in whatever position it may be held.

Another object of the improvement is to provide a reel or swift of simple and compact construction having its operating mechanism completely enclosed and protected from outside interference.

Another object of the improvement is to provide a reel or swift in which the operating mechanism is more durable in use and proof against derangement or getting out of order.

Another object of the improvement is to provide a reel or swift which may be economically manufactured to produce it at low cost.

Further objects of the improvement are set forth in the following specification which describes a preferred embodiment of the invention as illustrated by the accompanying drawings. In the drawings:

Fig. 2 is a longitudinal sectional view of the hub of the reel taken through its axis;

Fig. 3 is a view of a section of the hub of the reel taken on the line 3—3 of Fig. 2 looking in the direction indicated by arrow $x$ and showing it with the end-disk or annulus removed;

Fig. 4 is a similar view illustrating the manner in which the hub-members are rotated with respect to each other to bring their spokes together to contract the reel to facilitate the placing of the skein thereon; and Fig. 5 is a view of a section of the hub taken on the line 5—5 of Fig. 2 looking in the direction indicated by arrow $z$.

Figure 1:
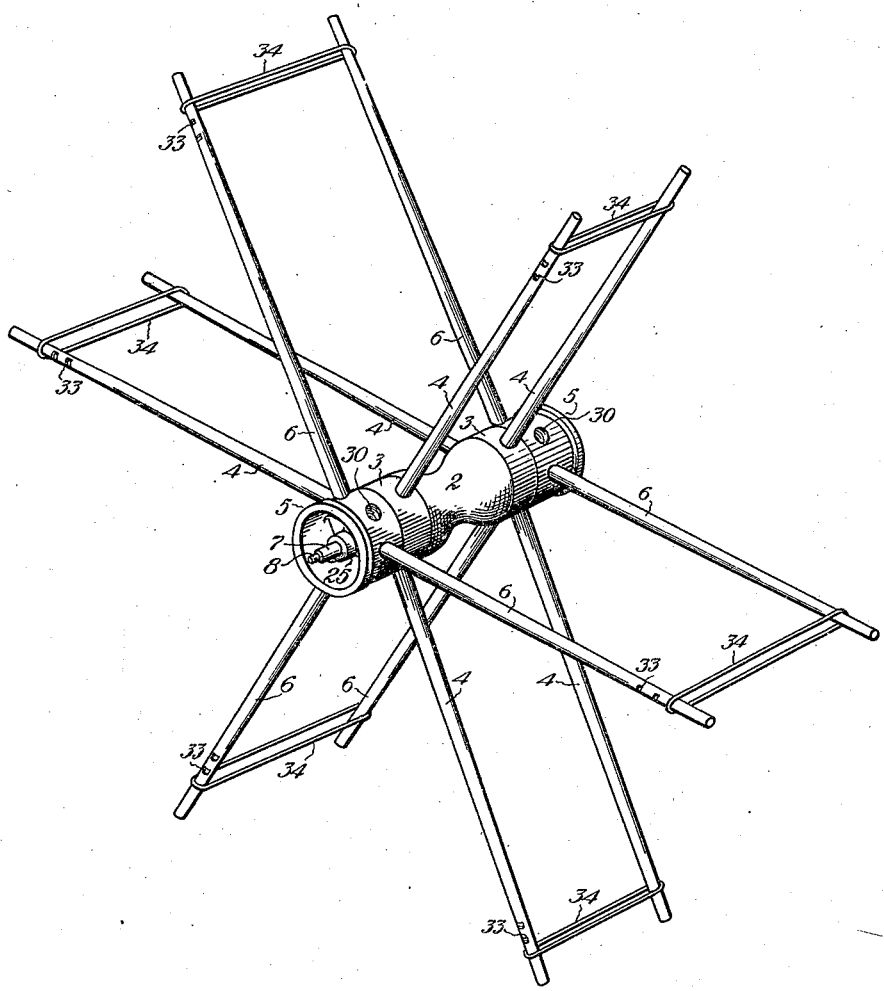
Fig. 1 is a perspective view of my improved reel or swift.

Referring first to Fig. 1 of the drawings, the present improved reel or swift comprises in general a central nave or hub-member 2 having end-disks 3 which are provided with sockets for one set of arms or spokes 4, and a pair of outer relatively rotatable hub-disks 5 formed with sockets for a second set of spokes 6. The main hub-member 2 is preferably constructed of wood, fiber or composition and is reduced in diameter at its center, or shaped like a spool, to reduce its weight while providing a solid and substantial structure. The member 2 is bored axially to receive a spindle or shaft 7 which turns freely therein and projects from its ends to receive the outer spoke-mountings or hub-disks 5 secured fast thereon. The ends of the spindle 7 are preferably turned down or reduced in diameter to form trunnions 8 adapted to serve as journals for rotatably mounting the reel in its bearings. The hub-disks 5 are constructed of metal, preferably of aluminum, and between them and the central hub-member 2 are the similar intermediate spoke-carrying disks 3.

Each inner hub-disk 3 is constructed with a web 9 which supports an overhanging annular flange 10 having holes for receiving the tapered wooden spokes 4. The ends of the spokes 4 fit into sockets 11 constituted by enlargements or ribs 12 formed on the face of the web 9. The interior walls of the bores or sockets 11 are preferably formed with blade-like projections 13 on their opposite sides which are arranged at an angle helically inclined with respect to the bores. When the spokes are forced into their bores with a twisting or turning thrust the blades 13 bite into the wood and grip the spokes to secure them against dislodgment. Suitable screws 15 having their heads countersunk into the face of the webs 9 are screwed into the central hub-member 2 to fasten the disks 3 fast on the ends thereof. As illustrated in Fig. 2, the annular flange 10 overhangs the rearward side of the web 9 of the disk 3 to form a rim 16 which fits into a groove or rabbet 17 on the circumferential edge of the member 2, thus centering the disk on the hub and providing a smooth joint between the parts.

The disks 3 are formed with axial bores 18 of larger diameter than the shaft or spindle 7, whereby to provide pockets for helical springs 20 coiled around the spindle with their ends extending radially therefrom; it being here noted that the springs are coiled or wound in opposite directions for a purpose as later explained. The inner end or radial leg 21 of each spring 20 is anchored and held laterally in a groove 22 formed in the rearward face of the web 9 of its respective disk 3, see Fig. 5. The outer end or leg 23 of each spring 20 projects across the flat face of one of the socket-ribs 12 on the opposite side of the disk 3 with its end engaged by a pin 24 which holds the spring under tension. The springs 20 provide resilient means for maintaining the outer end-hubs on disks 5 in position with their spokes 6 spaced equidistantly from the spokes 4 on the central hub-member 2, while allowing the disks to be rotated to contract the reel in the manner and for the purpose as hereinafter more fully explained.

The end-members or disks 5 are preferably constructed of aluminum with axial hubs 25 having spokes 26 which are bored radially to receive the wooden spokes or arms 6. As with the inner disks 3, the bores 27 are provided with blades or splines 13 which engage the spokes 6 to retain them in place. The socketed spokes 26 support overhanging annular rims 14 which abut the rims 10 on the disks 3, thus forming an extension of the main hub-member 2 and providing a smooth unbroken surface on the exterior of the hub of the reel. The hubs 25 of the disks 5 are provided with axial bores 28 fitted to receive the spindle 7 on which they are secured rotatively by means of set-screws 29. The set-screws 29 are screwed into threaded bores 30 with their ends engaging flatted portions 31 on the spindle 7. Suitable pins 32 driven through the disks 5 project laterally therefrom in position to engage the ends of the radial legs 23 of the springs 20 which surround the spindle 7 within the bores of the disks 3.

Referring now particularly to Fig. 1, my improved reel is here illustrated as constructed with three pairs of opposite arms or spokes 4 held in the disks 3 which are mounted fast on the ends of the central hub-member 2, and three pairs of similar spokes 6 alternating with those of the first set and carried by the relatively rotatable disks 5. If desired, however, a greater or less number of spokes may be employed. The spokes 4 and 6 are provided at their outer ends with notches 33 for receiving loops 34 of twine or wire which connect the opposite spokes of each pair and serve as supports or rests across which the skein is stretched in the usual manner. The method of operating the reel to stretch the skein thereover is as next explained.

The operator grasps the reel in one hand with the fingers enclosing two adjacent spokes 4 and 6 at one end of the hub near their points of joinder therewith. Then by closing the fingers together the spokes are caused to be brought toward each other as the outer hub-disks 5 are turned or rotated with respect to the inner disks 3 and hub-member 2. This action causes the pairs of inner spokes 4 to be swung into substantial alinement with the alternating pairs of outer spokes 6 so that the reel is partly collapsed to contract its outer periphery. With the reel held contracted in this manner in one hand, the operator's other hand may be used to stretch the skein across the cross-ties 34. Now, when the spokes of the reel are released they will spring back into extended relation to draw the skein taut across their cross-ties 34 to stretch its strands under the required tension. The reel may then be mounted to rotate to unwind the material from the skein by inserting its gudgeons 8 in suitable bearings as usually provided.

It will be understood by reference to Fig. 2 that the disks or end-hubs 5 carrying the spokes 6 may be rotated in either direction with respect to the main hub-member 2 and its attached disks 3 carrying the spokes 4. When the disks 5 are turned in a clockwise direction, viewing the reel from its right-hand end as shown in Fig. 2, the pin 32 in the left-hand disk 5 will act on the leg 23 of its respective spring 20 to wind up the spring, see Fig. 4. That is to say, the spring 20 at the left-hand end of the hub of the reel, as viewed in Fig. 2, resists the turning of the outer disks 5 in the direction as above indicated, so that when the pressure of the fingers on the spokes is released the disks 5 will be turned back again to bring the spokes into normal relation again. It is to be noted from Fig. 3, however, that when the leg 23 of the spring 20 has swung back to return the spokes to normal relation it is restrained from rotating the disks 5 to any further extent by its engagement with the stop-pin 24 on the disk 3.

Now, in the same manner, the spring 20 at the right-hand end of the hub acts to control the turning movement of the disks 5 in a contra-clockwise direction as viewed from this end in Fig. 2. That is to say, when the spokes 6 on the outer disks 5 are swung toward the spokes 4 by a rearward rotation of the disks 5 the leg 23 on the spring 20 at the right-hand end of the hub will act to resist this turning motion and will ultimately turn the disks 5 back again to once more bring the spokes 4 and 6 into normal relation. Stated briefly, the direction of action of the two springs 20 is opposed so that their force is normally balanced to maintain the spokes of the reel equidistantly spaced around the hubs, while allowing the two sets of spokes to be shifted in either direction to bring them together to contract or collapse the reel.

This double-acting principle of my improved reel constitutes an important feature of the invention as providing for greater convenience and facility in contracting it to place the skein thereon. Heretofore in devices of the present type the arrangement has usually been such that the spokes could only be swung toward each other in one direction. Hence the operator might grasp the spokes of the reel in such a way that they could not be forced together and consequently would be obliged to shift the grip before the reel could be contracted. Considerable time would therefore be lost in operating the reel and in some cases both hands would have to be used so that the work would be rendered more difficult. With the present improvement any two spokes at one side of the hub may be grasped and swung toward each other so that the operation of collapsing the reel is accomplished more expeditiously without taking care to select certain properly related spokes. The present reel may therefore be operated with one hand in whatever position grasped, leaving the other hand free for adjusting the skein or performing other work.

As a further feature of the present improvement, the operating mechanism of the reel is completely enclosed to conceal it from view and protect it from outside interference. It will be noted that there are no projecting wires, pins or other mechanical parts on the outside of the hub and arms of the reel, which would be liable to catch and snarl the yarn or thread in the skein, or to catch in the operator's clothing or injure the hands. The operating parts being contained in the hub of the reel are out of the way and protected from disarrangement or getting out of order so that the whole device is more efficient and durable in use. Furthermore, the mechanism is so simple and compact that the device may be manufactured economically at a relatively low cost. The simplicity and compactness of the mechanism also provides a reel of minimum weight which can be handled more easily, and which will rotate with less resistance so that it may be used for unwinding skeins of fine delicate material such as artificial silk or other gossamer threads.

While I have herein described and illustrated a preferred form of construction of the device, it is to be understood that various modifications may be made in the structure and arrangement of its parts without departing from the spirit or scope of the invention. Therefore without limiting myself in this respect, I claim:

1. A reel or swift comprising two sets of alternating spokes with the spokes of one set adapted to be brought into closed relation with the spokes of the other set to contract the reel, and resilient means acting in opposite directions to normally maintain the spokes in open relation while allowing one set to be rotated on the axis of the reel in either direction with respect to the other set to bring the spokes into proximity to partly collapse the reel, said resilient means also operative to return the spokes to open relation after one set has been rotated with respect to the other set to contract the reel.

2. In a reel or swift, the combination of a hub-member carrying relatively fixed spokes at its ends, disks rotatively mounted on the ends of the hub-member and carrying spokes alternating with the fixed spokes, and means for holding the disks in certain relation with respect to the hub-member to maintain their spokes substantially equidistantly spaced from the fixed spokes while allowing one set of spokes to be rotated to bring them into proximity with the spokes of the other set, said means acting automatically to effect relative rotation between the disks and hub to return the spokes to open relation after they have been moved into proximity to contract the reel.

3. In a reel or swift, the combination of a central hub-member, spokes projecting radially from the ends of said hub-member, disks rotatable at the ends of the hub-member, spokes radiating from the disks, and opposed springs connecting the disks with the hub-member and acting to hold the disks in certain relation therewith to maintain the spokes substantially equidistantly spaced while allowing relative rotation between the disks and hub-members in either direction to bring the spokes together to partly collapse the reel.

4. In a reel or swift, the combination of a central hub carrying radial spokes at its ends, disks rotatably mounted at the ends of the hub, radial spokes carried by the disks, and resilient means for holding the disks in certain relation with respect to the hub to maintain the spokes substantially equidistantly spaced apart, said means acting to return the disks to first position after they have been rotated with respect to the hub to bring the spokes into proximity to contract the reel.

5. In a reel or swift, the combination of a central hub carrying radial spokes at its ends, disks rotatably mounted at the ends of the hub, spokes radiating from the disks, and resilient means for holding the disks and hub in predetermined relation to maintain their spokes substantially equidistantly spaced therearound, said means acting to effect relative rotation between the disks and hub to return the spokes to normal position after they have been moved into proximity to contract the reel.

6. In a reel or swift, the combination of a central hub, radial spokes carried by the hub, an axial spindle projecting from the ends of the hub, disks mounted on the spindle to rotate with respect to the hub, spokes radiating from the disks, and springs coiled around the spindle and acting between the hub and the disks to normally hold the latter with their spokes equidistantly spaced from the spokes on the hub while permitting relative rotation between the disks and hub in either direction to bring the spokes into folded relation, said springs acting between the hub and the disks to return the spokes to open relation after they have been closed together.

7. In a reel or swift, the combination of a central hub, spokes radiating from the ends of the hub, a spindle rotatable in the hub and projecting from its ends, disks fast on the ends of the spindle, radial spokes carried by said disks, and springs coiled around the spindle and anchored at their inner ends to the hub with their opposite ends connected to the disks to maintain the latter with their spokes equidistantly spaced from the spokes on the hub while allowing a relative turning movement in either direction therebetween to bring the spokes together to contract the reel, said springs acting to return the spokes to open relation after they have been closed by rotating the disks with respect to the hub.

8. In a reel or swift, the combination of a central hub carrying radial spokes, an axial spindle projecting through the hub, disks fast on the ends of the spindle, spokes radiating from the disks, springs coiled around the spindle at opposite ends of the hub with their inner ends anchored thereto, means engaging the opposite ends of the springs to hold them under tension, and means on the disks engaging the springs to cause the latter to resist rotation of the disks in either direction with respect to the hub, while also adapting the springs to rotate the disks to return the spokes to open relation after they have been closed together.

9. In a reel or swift, the combination of a central hub carrying radial spokes, an axial spindle rotatable in the hub, disks fast on the ends of the spindle, radial spokes on the disks, springs coiled around the spindle with their inner ends anchored to the hub and having radial legs at their outer ends, means engaging the legs to hold the springs under tension, and means on the disks engaged by the legs of the springs to control the turning movement of the disks in either direction with respect to the hub and to cause the disks to be rotated by the springs to return the spokes to open relation after they have been closed together.

In testimony whereof I hereunto affix my signature.

HARRY P. LEE.